Sept. 22, 1936.    G. BRIGGS    2,054,849
MASSAGE APPLIANCE OR THE LIKE
Filed Jan. 11, 1935
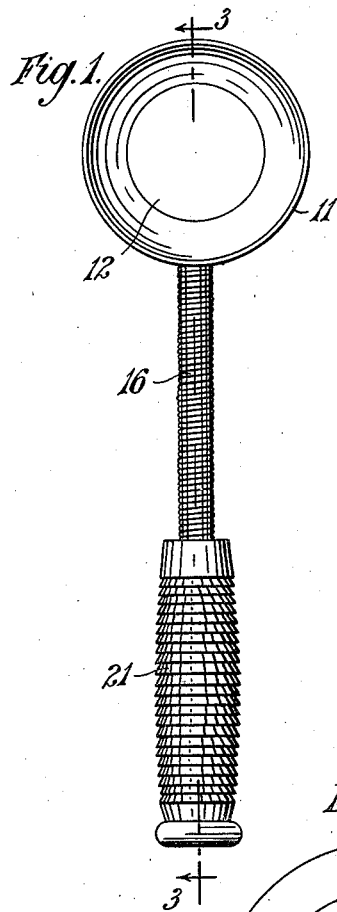
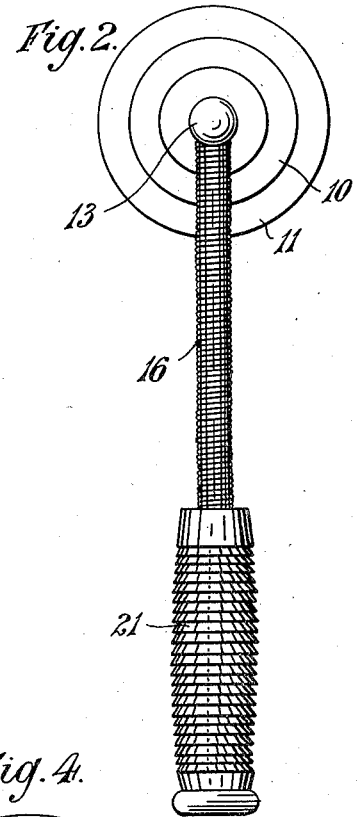
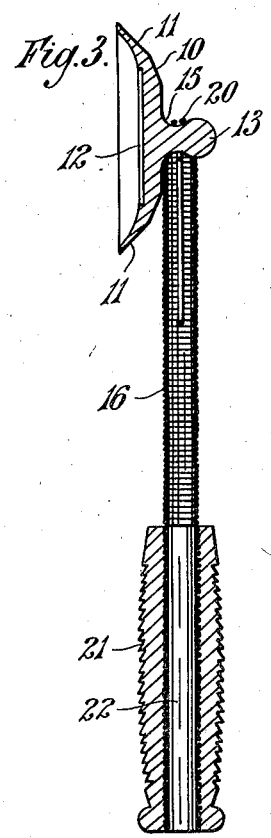
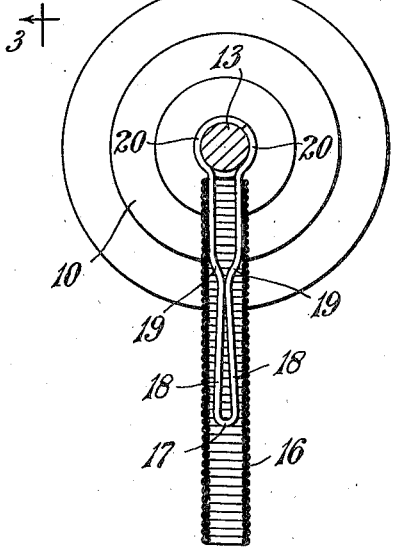
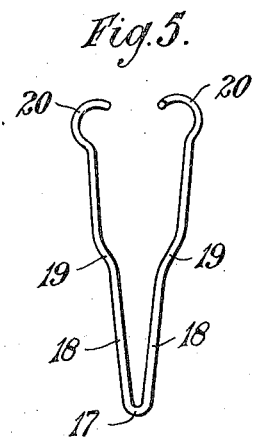
Inventor.
George Briggs Patented Sept. 22, 1936

2,054,849

UNITED STATES PATENT OFFICE 2,054,849

MASSAGE APPLIANCE OR THE LIKE

George Briggs, London, England

Application January 11, 1935, Serial No. 1,381
In Great Britain March 17, 1934

2 Claims. (Cl. 128—54)

This invention relates to improvements in massage appliances, vibration devices and the like for the treatment of the skin, and has for its chief object to provide a device for the use of ladies and others which will improve the complexion, tend to remove wrinkles and other skin blemishes and otherwise generally improve the health of the skin.

Several forms of massage or vibration devices for the treatment of the skin have heretofore been proposed, and these devices have usually comprised a patting member arranged at the upper end of a springy support which is carried at its lower end in a handle. Such devices as heretofore proposed, however, have suffered from certain disadvantages, amongst which may be mentioned that the patting member, which in certain cases has been in the form of a suction cup, has been too hard or rigid so that there is a tendency for the same to bruise the face or other part of the body during use.

This disadvantage is overcome by means of the present invention, according to which the device comprises essentially a rubber sucker having a thinned edge which is carried at the end of a support, preferably flexible and springy, which in turn is mounted at its lower end in a handle, so that the sucker may be used to pat the face or other part of the body repeatedly and thereby cause, if desired, a skin cream or food to be thoroughly kneaded into the skin.

By the use of a sucker having a thinned edge the impact of the patter on the skin will be lessened and the force distributed more evenly over the part of the face or the like being patted. Furthermore, the base part of the sucker will tend to force the skin food or cream into the skin and the thinned edge will materially assist in the maintenance of the vacuum or suction on the skin which will have a beneficial effect in removing wrinkles and so on.

The support for the rubber sucker is preferably in the form of a length of closely coiled wire which is mounted at its lower end in a rigid or flexible handle and which preferably extends right down to the bottom of the handle.

Any means of mounting the rubber sucker at the upper end of the support may be employed, but such means should preferably be such that the sucker can be readily released and a fresh sucker inserted in place.

In order that this invention may be the more clearly understood and readily carried into effect, I will proceed to describe the same with reference to the accompanying drawing, which illustrates by way of example and not of limitation one convenient constructional form of this invention, and in which Figure 1 is a front elevation of the device.

Figure 2 is a rear elevation thereof, and

Figure 3 is a central vertical section on line 3—3 of Figure 1.

Figure 4 is an enlarged section of the upper end of the flexible support showing the sucker mounting means in position, and Figure 5 is a perspective view of the sucker mounting spring detached from the sucker and from the support.

Referring now to the drawing, the massage or vibration device therein illustrated comprises a rubber or like sucker 10 having a thinned peripheral edge 11 which thus has considerably more resiliency than the main body of the sucker. On its front surface, the sucker within the thinned peripheral edge is flat as at 12. On the back surface the sucker is provided with a knob 13 which is necked as at 15.

The sucker is adapted to be mounted at the upper end of a flexible and springy support which, in the form shown in the drawing, comprises a closely coiled length of wire 16. Any suitable means may be employed for mounting the sucker at the upper end of the coiled wire support 16, for example, the uppermost coil of the spring 16 may be turned at right angles and take about the neck 15 of the knob 13. I prefer, however, to mount the sucker at the upper end of the support in such a manner that it may be readily detached and replaced by a new sucker, for example, when the old sucker becomes dirty or the thinned edge loses its elasticity. For this purpose I may use a length of wire for the purpose of mounting the sucker at the upper end of the support, as shown more particularly in Figures 4 and 5 of the accompanying drawing. The length of wire is bent at its centre as at 17 and the two halves extend upwardly, first parallel or approximately parallel to one another as at 18, in the normal unstrained position (see Figure 5), and then diverge from one another as at 19, the ends being finally curved approximately in the form of semicircles as at 20. The semi-circular parts of the spring embrace the neck 15 of the knob of the sucker. In use, the parallel parts 18 are inserted into the upper end of the support in which they are a close sliding fit, and the sucker carrier, with the sucker in position thereon, is then pressed down into the bore of the support. Due to the engagement of the coil spring with the diverging parts 19, these parts will be moved towards one another and the semicircular parts 20 will grip firmly about the neck 15 of the sucker.

When it is desired to change the sucker, it is merely necessary to unscrew or otherwise remove the fitting 18, 19, 20 from the coiled spring support 16, when the two semicircular parts 20 of the holder will move away from the neck of the sucker and the sucker will be released. A fresh sucker may be inserted as above described.

At its lower end, the coiled spring support 16 is mounted in a handle or grip 21, it preferably extending to the bottom end of the handle and being located in a central bore therein. The handle 21 may be flexible (made of rubber or the like), or may be rigid (made, for example, of the material sold under the registered trade-mark "Bakelite"). When a flexible handle is employed, a very fine adjustment of the frequency and strength of the pats delivered by the sucker 10 may be obtained by gripping the handle at different distances from the bottom. In some cases, also a rigid rod 22 may be inserted friction-tight or otherwise up the centre of the coiled spring support 16 within the handle, this rigid rod extending a part or the whole of the length of the handle.

Now it will be appreciated that for the efficient operation of the device the support 16 above the handle should move always in the same plane when oscillated by hand in order that the sucker may always strike the face squarely at the same or approximately the same place. Whilst this effect is to a certain extent due to the manner in which the device is manipulated, yet I have found it very difficult to obtain the same if the support be in the form of a thin flexible rod. On the other hand, I have found the coiled spring form of support shown in the drawing to facilitate materially the obtaining of this effect, particularly if the gauge of wire used and the length of the support above the handle be appropriately chosen. I have found that by using steel wire of say 19 gauge and by having the support of one quarter of an inch diameter and projecting three and a quarter to three and three-eighths inches above the handle particularly satisfactory results can be obtained. Such a construction with a sucker weighing about one-fifth of an ounce gives the support about the upper end of the handle a natural periodicity of about 300 which I have found to be very satisfactory.

The coiled wire support 16 may be replaced by any other suitable flexible support such, for example, as a flat strip spring or a length of rubber, rod or tube, the sucker being suitably attached to the upper end thereof preferably in such a manner that it can be readily removed and a fresh sucker substituted as and when desired. Or again a rigid support may be used for the sucker, in which case the necessary movement is obtained from the wrist of the user.

One method of using the device consists in placing a small quantity of face cream or skin food on the cheek or other desired part of the body and then, by means of a slight backward and forward movement of the handle, causing the sucker to pat the cheek or the like. The thinned edge of the sucker will prevent any chance of the flesh being bruised by the impact of the sucker, and the flat part 12 will be effective in kneading or pressing the cream or skin food into the skin. Furthermore, the suction set up when the sucker commences to move away from the skin, which suction is materially enhanced by the thinned edges of the sucker which maintain the suction for a longer time than if the edges were not thinned, will draw out the skin and thus tend to remove the wrinkles.

I claim:—

1. A massage appliance comprising a handle having an axial bore, a flexible and springy support formed of closely coiled wire extending at one end into the bore of said handle and projecting therefrom, a rubber suction cup having thinned peripheral edges and a tapering wire holder for said suction cup adapted for insertion into the upper end of said coiled wire support so that when said wire holder is pressed into the upper end of said coiled wire support the rubber suction cup is firmly gripped and removably mounted at the upper end of the support.

2. A massage appliance comprising a handle having an axial bore, a flexible and springy support formed of closely coiled wire extending at one end into the bore of said handle and projecting therefrom, rubber suction cup having thinned peripheral edges, a necked projection on the back of said suction cup and a tapering wire holder for said suction cup surrounding the necked projection and adapted for insertion into the upper end of said coiled wire support so that when said wire holder is pressed into the upper end of said coiled wire support the necked projection of the suction cup is firmly gripped and the suction cup is thereby removably mounted at the upper end of the support.

GEORGE BRIGGS.